(12) United States Patent
Carr et al.

(10) Patent No.: US 7,111,567 B2
(45) Date of Patent: Sep. 26, 2006

(54) METHOD AND APPARATUS FOR PLANTING SEED IN A SEED RESEARCH PLOT

(75) Inventors: Brian W. Carr, Nevada, IA (US); Scott A. Sporrer, Nevada, IA (US); Donald F. Handorf, Ames, IA (US); Nick Merfeld, Nevada, IA (US); Peter B. Moore, Ames, IA (US)

(73) Assignee: Gary W. Clem, Inc., Nevada, IA (US)

( * ) Notice: Subject to any disclaimer, the term of this patent is extended or adjusted under 35 U.S.C. 154(b) by 73 days.

(21) Appl. No.: 10/958,763

(22) Filed: Oct. 5, 2004

(65) Prior Publication Data

US 2005/0056196 A1 Mar. 17, 2005

Related U.S. Application Data

(62) Division of application No. 10/663,513, filed on Sep. 16, 2003, now Pat. No. 6,832,567.

(60) Provisional application No. 60/432,361, filed on Dec. 10, 2002.

(51) Int. Cl.
*A01C 7/00* (2006.01)
(52) U.S. Cl. .................... 111/185; 111/900
(58) Field of Classification Search ............ 111/185, 111/181, 183, 184, 186, 174, 177, 170, 900, 111/200; 221/211, 277, 278, 265; 222/167, 222/426
See application file for complete search history.

(56) References Cited

U.S. PATENT DOCUMENTS

| | | | | | |
|---|---|---|---|---|---|
| 3,796,346 | A | * | 3/1974 | Ribouleau | 221/211 |
| 3,888,387 | A | * | 6/1975 | Deckler | 221/278 |
| 4,449,642 | A | * | 5/1984 | Dooley | 221/211 |
| 5,058,766 | A | * | 10/1991 | Deckler | 221/254 |
| 5,535,917 | A | * | 7/1996 | Ribouleau | 221/211 |
| 6,193,175 | B1 | * | 2/2001 | Andersson et al. | 239/656 |
| 6,527,205 | B1 | * | 3/2003 | Andersson et al. | 239/656 |
| 6,615,754 | B1 | * | 9/2003 | Unruh et al. | 111/181 |
| 6,644,225 | B1 | * | 11/2003 | Keaton | 111/175 |
| 6,748,885 | B1 | * | 6/2004 | Sauder et al. | 111/180 |

* cited by examiner

*Primary Examiner*—Victor Batson

(57) ABSTRACT

A seed meter for planting seeds includes a seed plate rotatably mounted within a housing. A rotary seed chamber (RSC) is mounted in the housing adjacent the seed plate and movable between first and second positions, to permit the seed plate to singularly select individual seeds from the RSC while in a first position, and to dump seed therefrom as well as blocking seeds from entering the seed plate while in a second position. A seed intake compartment having an inlet end, and a discharge end is located adjacent the RSC. A valve is located in the intake compartment to intermittently prevent seed from flowing from the inlet end to the discharge end. A power means actuates both the RSC and the valve. A wing plate on the rotary seed chamber opens and closes the discharge end as the rotary seed chamber is in its first and second positions, respectively.

4 Claims, 8 Drawing Sheets

METHOD AND APPARATUS FOR PLANTING SEED IN A SEED RESEARCH PLOT

CROSS REFERENCE TO A RELATED APPLICATION

This application is a division of U.S. patent application Ser. No. 10/663,513 filed Sep. 16, 2003, now U.S. Pat. No. 6,832,567 which is a continuation of Ser. No. 60/432,361 filed Dec. 10, 2002.

BACKGROUND OF THE INVENTION

Planters for seed research plots are used to select from different groups of seeds for planting in a short segment of a row, and thence stop the planting in the first segment and to select sequentially seed from another group until a plurality of segments of a row (or more) are planted with seeds from different groups. The seeds from each group represent different types and characteristics of corn seed, for example.

One of the most significant shortcomings of existing planters is that they require a plurality of control systems to accommodate the various functional requirements such as stopping and starting the flow of seed, the coordination of seed inlets and outlets, the contamination of seed groups and the elimination of extra seed. Such existing planters are very expensive to manufacture, maintain, and service.

It is therefore a principal object of this invention to provide a method and means for planting seeds in a seed research plot.

A further object of this invention is to provide a method and apparatus for planting seed in a seed research plot which can control the various phases of seed handling with a single control system.

A still further object of this invention is to provide a method and apparatus for planting seed in a seed research plot which is inexpensive to manufacture, and economical to maintain and service.

These and other objects will be apparent to those skilled in the art.

SUMMARY OF THE INVENTION

A seed meter for planting seeds includes a seed plate rotatably mounted within a housing. A rotary seed chamber (RSC) is mounted in the housing adjacent the seed plate and movable between first and second positions, to permit the seed plate to singularly select individual seeds from the RSC while in a first position, and to dump seed therefrom as well as blocking seeds from entering the seed plate while in a second position. A seed intake compartment having an inlet end, and a discharge end is located adjacent the RSC. A valve is located in the intake compartment to intermittently prevent seed from flowing from the inlet end to the discharge end. A power means actuates both the RSC and the valve. A wing plate on the rotary seed chamber opens and closes the discharge end as the rotary seed chamber is in its first and second positions, respectively.

DESCRIPTION OF THE PREFERRED EMBODIMENT

Figure 1:
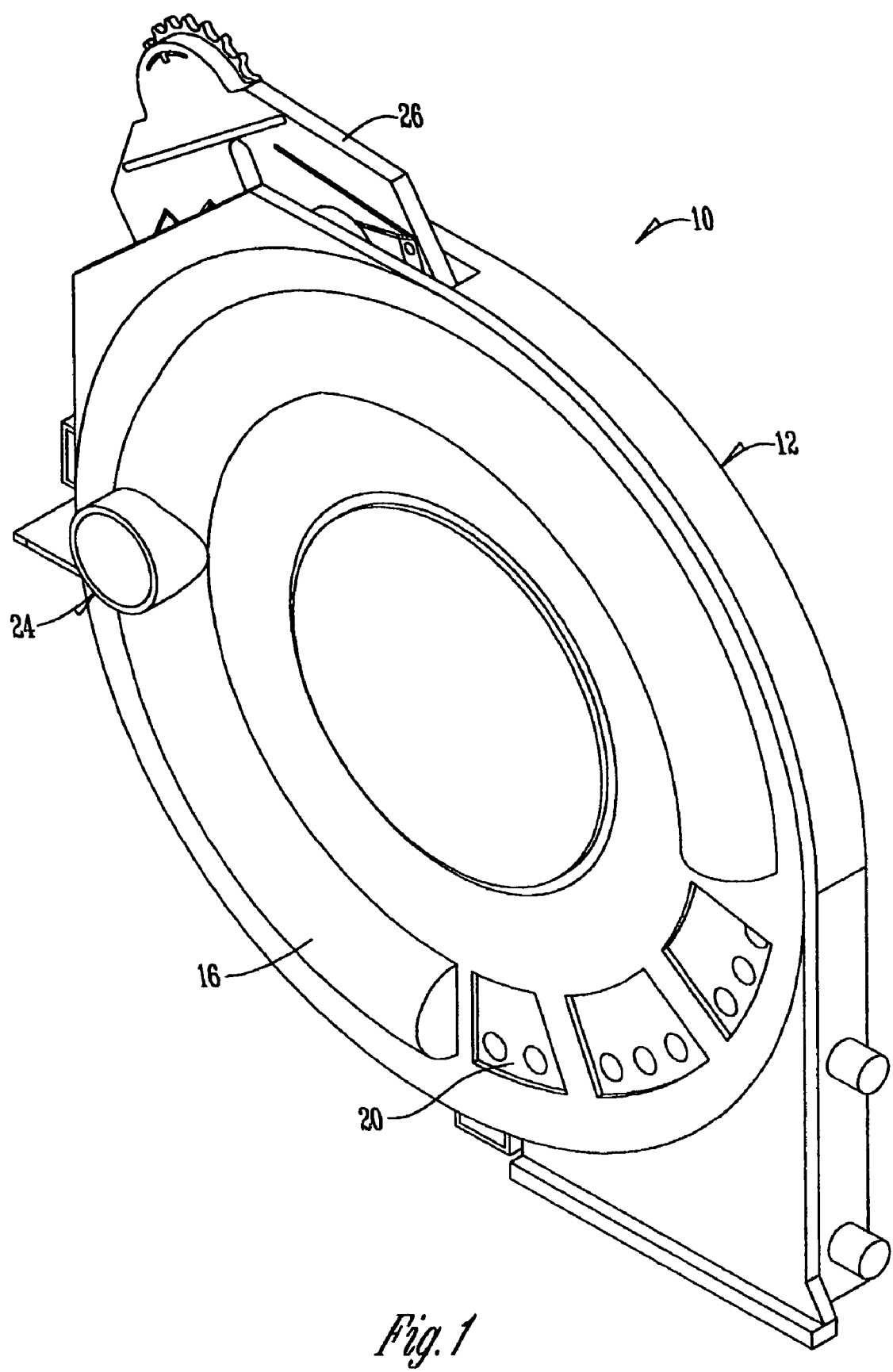
FIG. 1 is a perspective view of a first side of a seed planter made according to this invention.

With reference to FIG. 1, a seed meter 10 has a housing 12 with a rotatable shaft 14 (FIG. 2) extending into the housing. Housing 12 has a front cover 16 (FIG. 1) and a rear cover 18 (FIG. 3). The rear cover 18 has an excess seed discharge opening 19.

Figure 2:
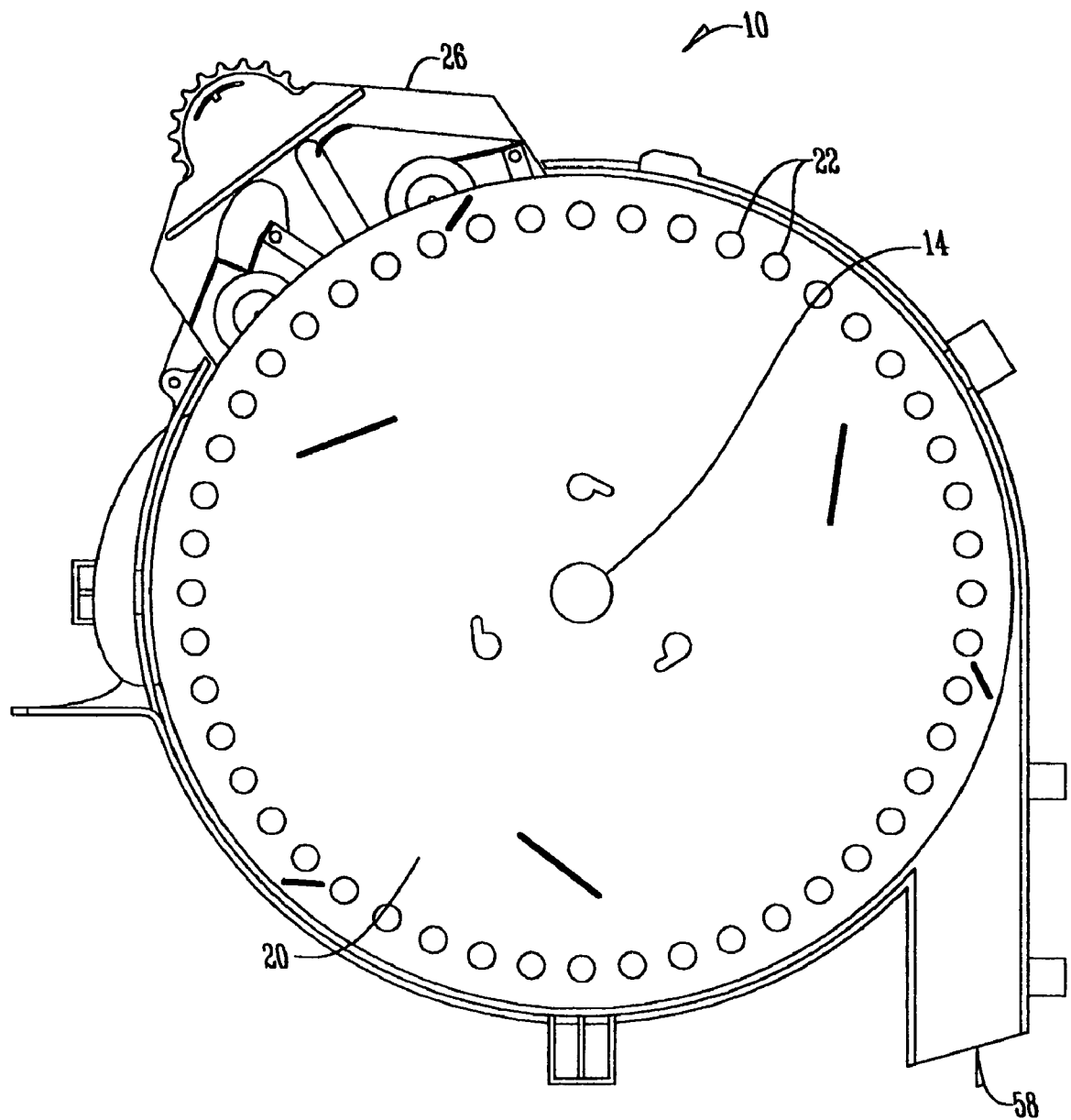
FIG. 2 is a side elevational view of the device of FIG. 1 with the first side cover removed.
Figure 3:
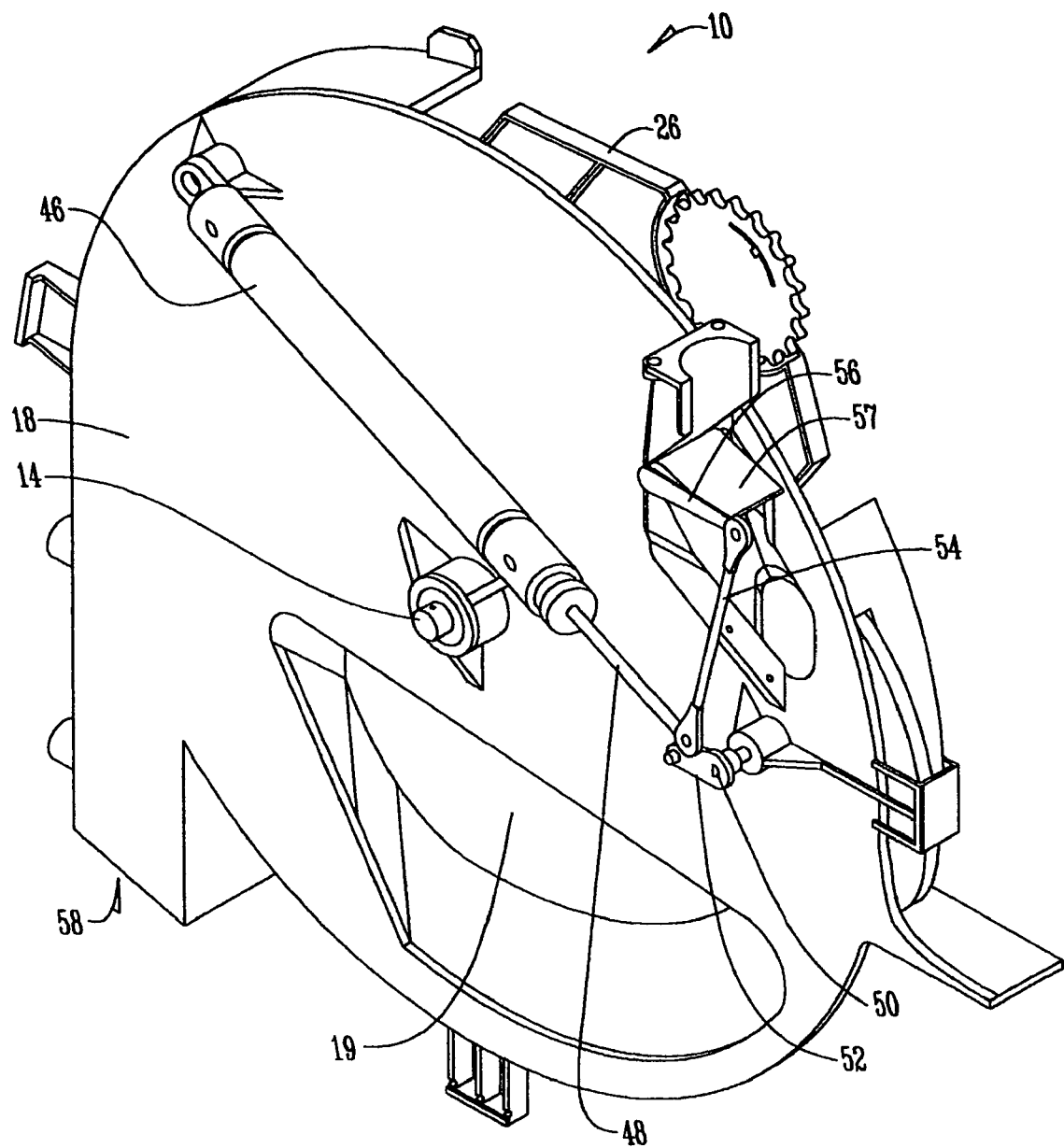
FIG. 3 is a perspective view of a second side of the seed planter of FIG. 1, in a first phase of its operation.

With reference to FIGS. 1 and 2, the housing includes a conventional circular seed plate 20 which is mounted on shaft 14 and has a plurality of conventional seed apertures 22 which are subjected to a vacuum environment for a portion of its circumference as will be discussed hereafter. A conventional vacuum port 24 is in housing 12 (FIG. 1) to accommodate this situation. A conventional seed singulator 26 is mounted in housing 12 immediately adjacent seed plate 20 to perform its conventional function of limiting the number of seeds to a single seed (picked up by the apertures 22 on seed plate 20). The seed singulator 26 is produced by Case-International, Inc. and does not, per se, comprise a part of this invention.

Figure 5:
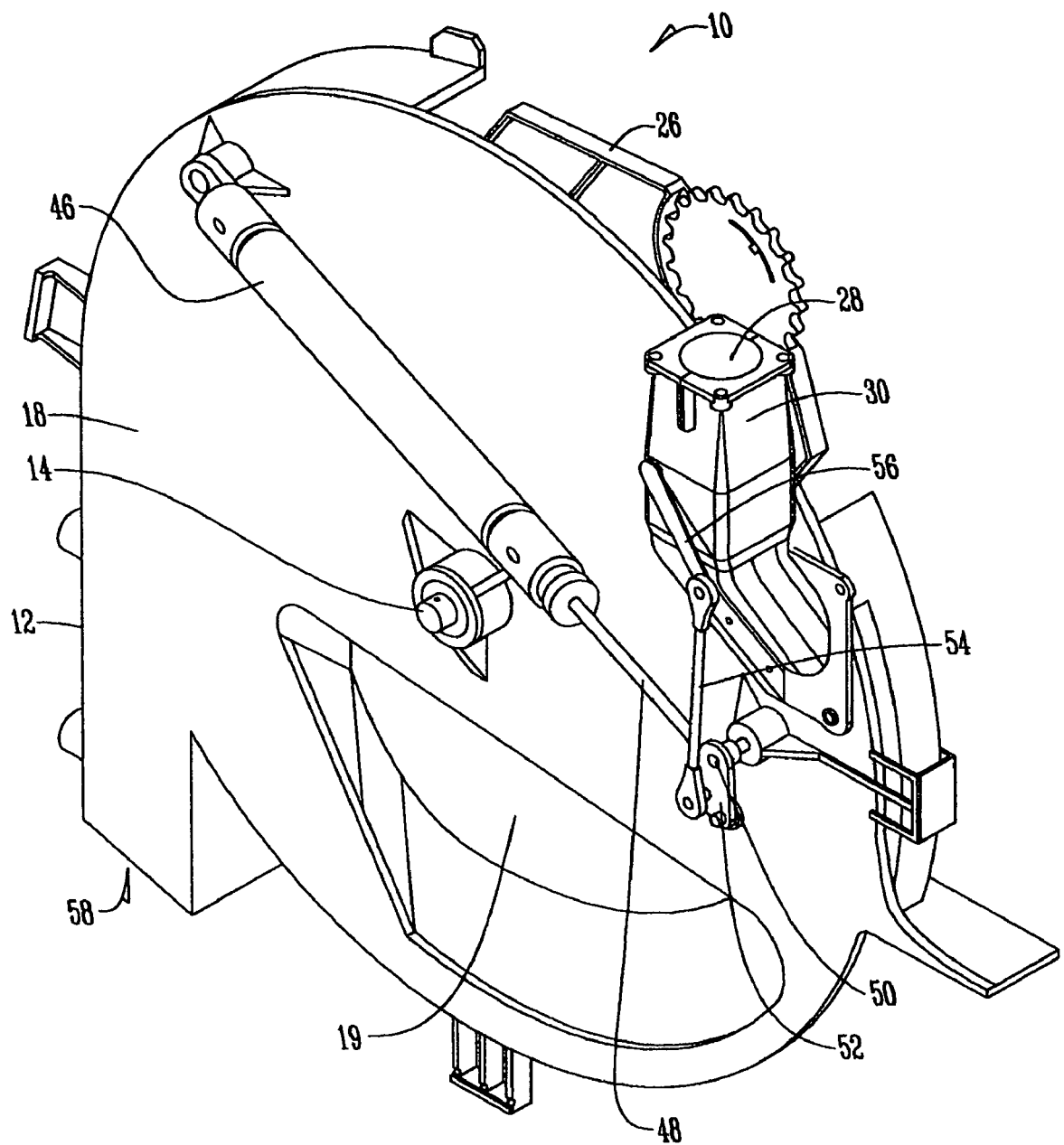
FIG. 5 is a view similar to that of FIG. 4 but in a third stage of its operation.
Figure 8:
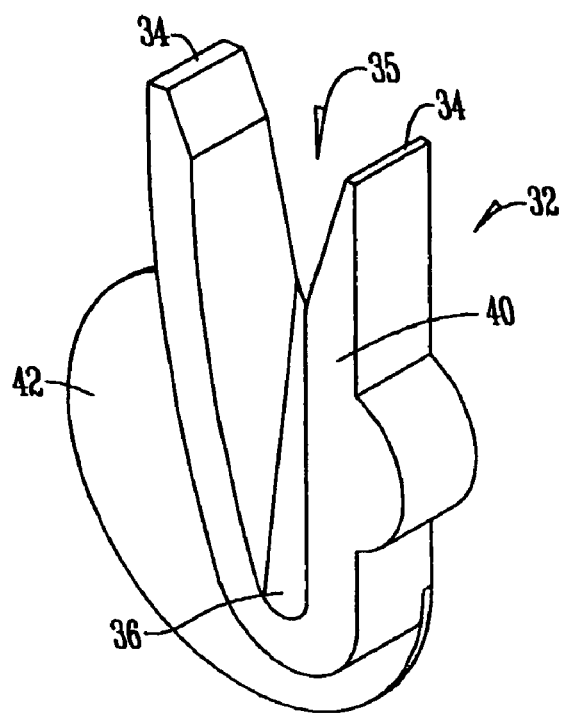
FIGS. 8 & 9 are perspective views of the rotating seed chamber taken at various angles, with FIG. 8 showing one side, and FIG. 9 showing the other side.
Figure 9:
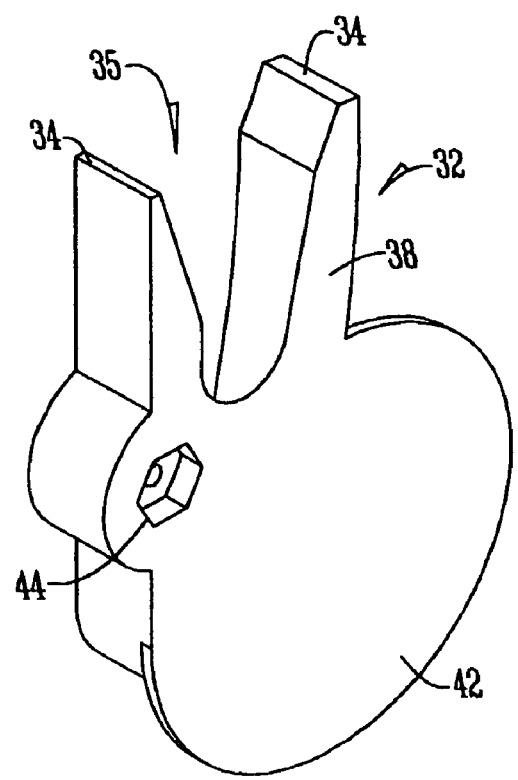

With reference to FIGS. 5, and 8–9, a fill tube port 28 is located in the top of fill tube changer 30 which has an exit port 31 (FIG. 6) in the bottom thereof which is in communication with a V-shaped rotary seed chamber (RSC) 32. The RSC, shown best in FIGS. 8–9, has outwardly spaced arms 34 creating a seed compartment 35 therebetween and which has an inclined flow groove 36 adjacent the inner arms 34. The RSC has first side 38 (FIG. 9) and a second side 40 (FIG. 8). A wing or plate 42 forms a part of the second side 40 and extends outwardly from the seed compartment 35. A hex-shaped bore 44 appears in the second side 40 (FIG. 9).

Figure 4:
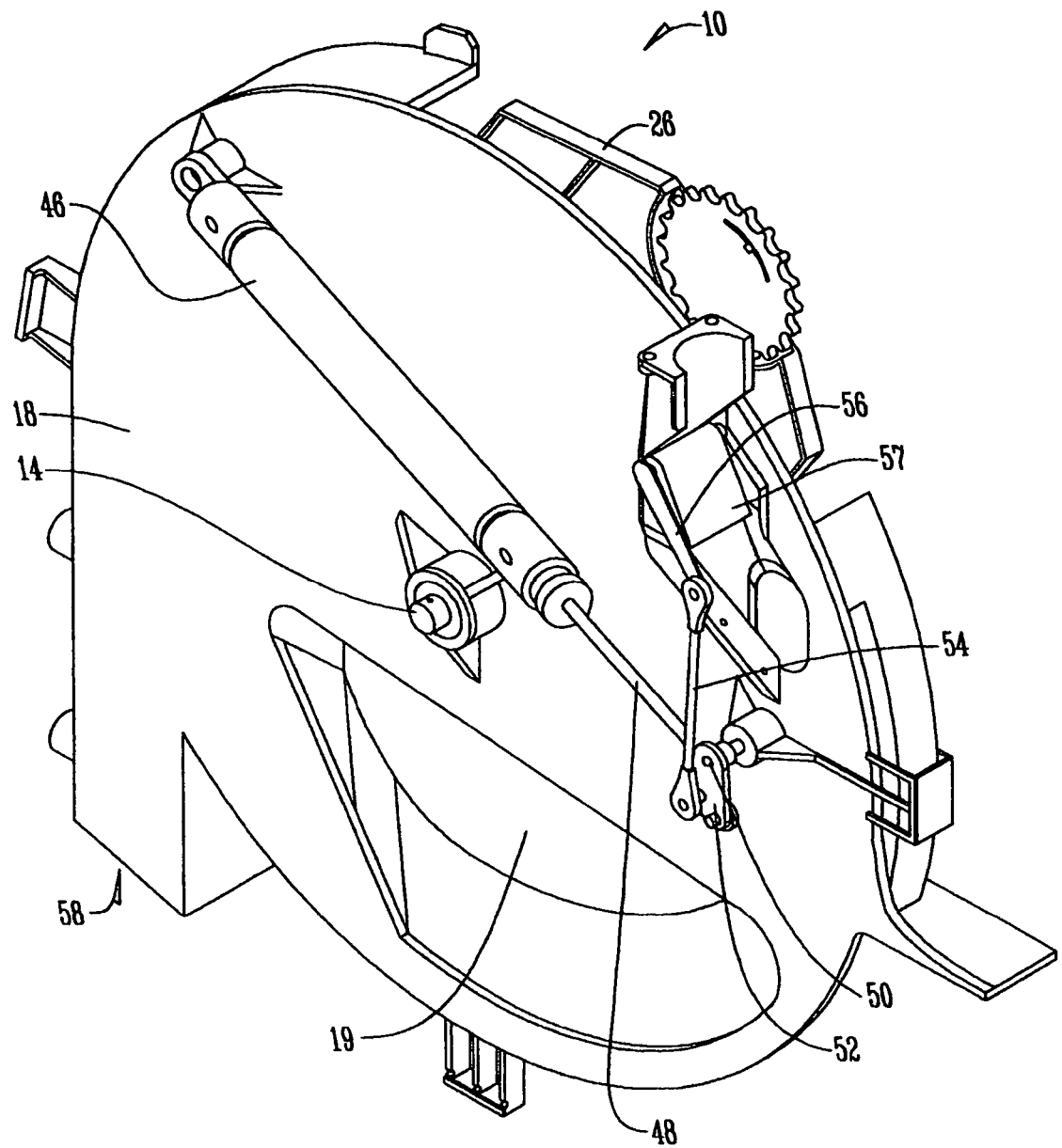
FIG. 4 is a view similar to that of FIG. 3 but in a second stage of its operation.

With reference to FIGS. 3–5, an air piston 46 is mounted to the rearward side of the housing 12 and has a conventional piston rod 48 extending outwardly therefrom. The piston 46 is double acting so as to reciprocate the movement of the rod 48. The outer end of the piston rod 48 is pivotally secured to shaft 50 and to one end of link 52. The end of shaft 50 opposite link 52 extends into the housing 12 and terminates in a hex-shaped end (not shown) which is compatible with the hex-shaped bore 44 of RSC 32 so that the rotation of the shaft 50 will coordinate with the rotation of the RSC. A rod 54 is pivotally secured to the end of link 52 opposite to its connection to piston rod 48 and extends upwardly to be secured to one end of a flapper valve crank 56. The flapper valve 56 has its opposite end pivotally secured to the outside of fill tube chamber 30 and extends therein to control the position of a flat flapper valve plate 57 which is adapted to pivot between a horizontal closed position (FIG. 3) to a downwardly extending open position (FIG. 4), depending on the position of the flapper valve crank 56.

As will be discussed hereafter, the housing 12 has a planting seed discharge port 58 (FIG. 2), through which seeds from the seed plate 20 are ultimately disengaged for delivery to a conventional planting assembly (not shown).

In operation, the planter upon which the seed meter 10 is mounted has a plurality of groups of seeds that are to be planted sequentially in a given row in conjunction with a controller (not shown) operatively connected to the meter 10 to control the sequential delivery of the individual groups of seed to the meter 10. The controller limits the number of seeds from each group which are in fact to be planted by controlling the operation of air cylinder 46. Such a planter will plant a plurality of rows at one time with a seed meter 10 associated with the planting of each row. The following description will apply to the sequence of events which takes place in the planting of each row.

With reference to FIG. 3, the piston rod 48 is in its retracted position wherein the flapper valve 56 in fill tube chamber 30 is in a horizontal closed position. Rotational motion is provided to shaft 14 in a conventional manner. Typically, the planter will be set up to plant a first number of seeds from a first group of seeds, and then will automatically stop the planting of the first group of seeds and will instantaneously introduce seeds from a second group into the system. Typically, the individual seeds will be planted five to six inches apart and each segment of planted seeds in a given row could be in the general range of two feet long or up to 25 feet or so. The planting format for a given row is imposed on the controller which actuates air cylinder 46 consistent with the planting strategy.

The system will deliver a first quantity of seeds from a first group into the chamber 30 via port 28. The closed flapper valve 56 will not permit the seed to be dropped to the bottom of the chamber 30. The controller then actuates the piston 46 to cause the piston rod 48 to move from the position of FIG. 3 through the position of FIG. 4 to the position of FIG. 5 which permits the seed in the chamber 30 to drop to the bottom thereof.

While the piston 46 is in the position of FIG. 5, the RSC 32 is in a position such that the wing 42 closes the seed exit 31 of the seed chamber 30 because the compartment 35 is in a dumping position (FIG. 7) wherein any excess seed existing therein falls by gravity outwardly through the seed discharge opening 19. Additionally, in the position shown in FIG. 7, the RSC 32 acts as a wiper to dislodge remaining seeds from the seed plate 20.

Figure 6:
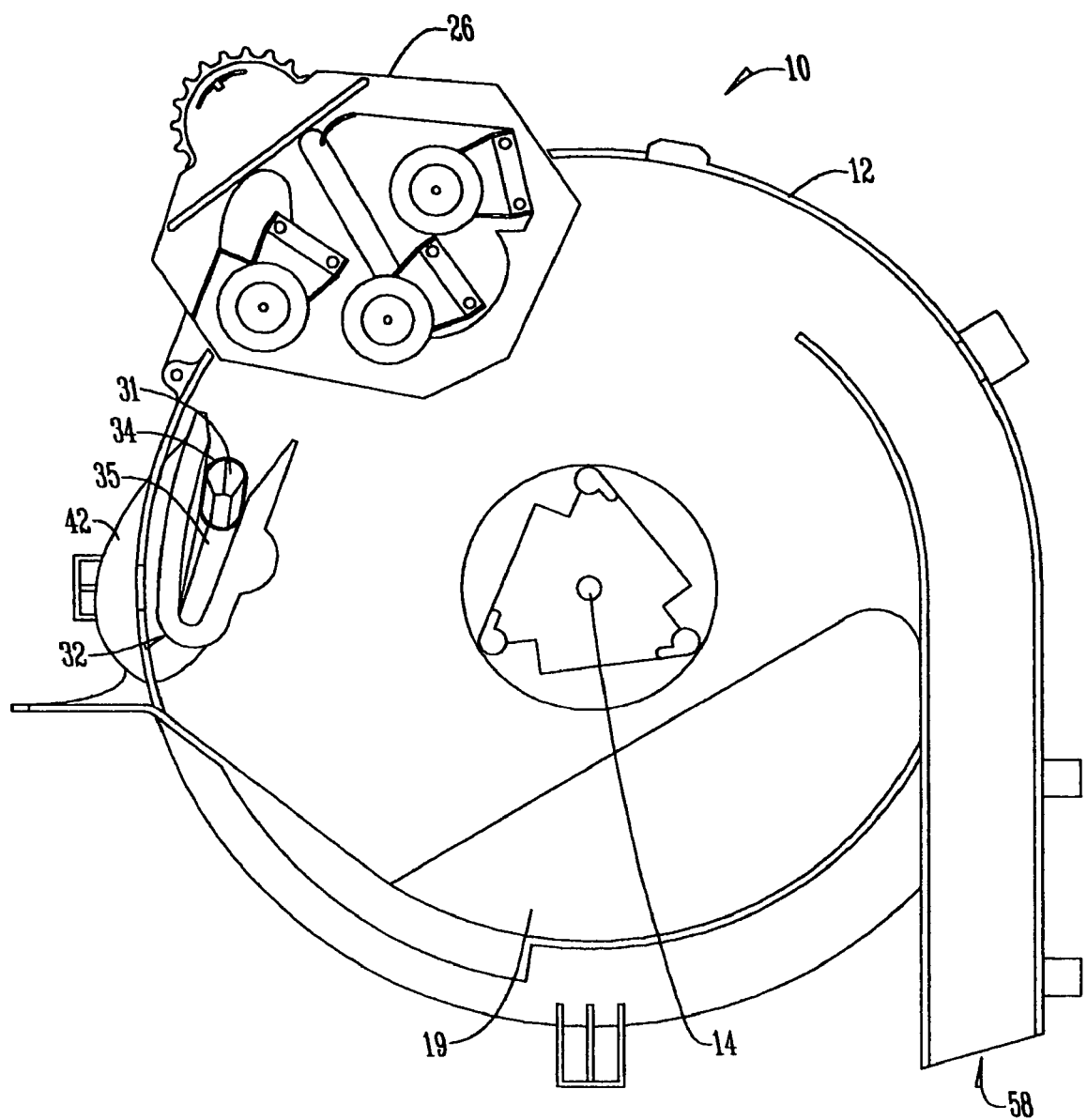
FIG. 6 is a side elevational view of a second side of the seed planter of FIG. 1.

However, when the piston 46 is moved to the position of FIG. 3 the seed chamber 32 rotates in an upwardly direction, the wing 42 opens seed exit 31 and seed is permitted then to flow into the compartment 35 of the RSC 32 (FIG. 6). At that time, the seed plate 20 and vacuum port 24 of the meter 10 begin to pick up individual seeds from the compartment 35. Slightly downstream from the RSC 32, the seed singulator 26 "knocks off" additional seeds clinging to each aperture 22 in the event that more than one seed is held in place on the seed plate 20. The seed plate 20 then rotates from approximately an 11 o'clock position as shown in FIG. 2 to a 3 o'clock position wherein the selected individual seeds are removed from the seed plate 20 by conventional means and discharged into the planting mechanism through the discharge port 58.

Figure 7:
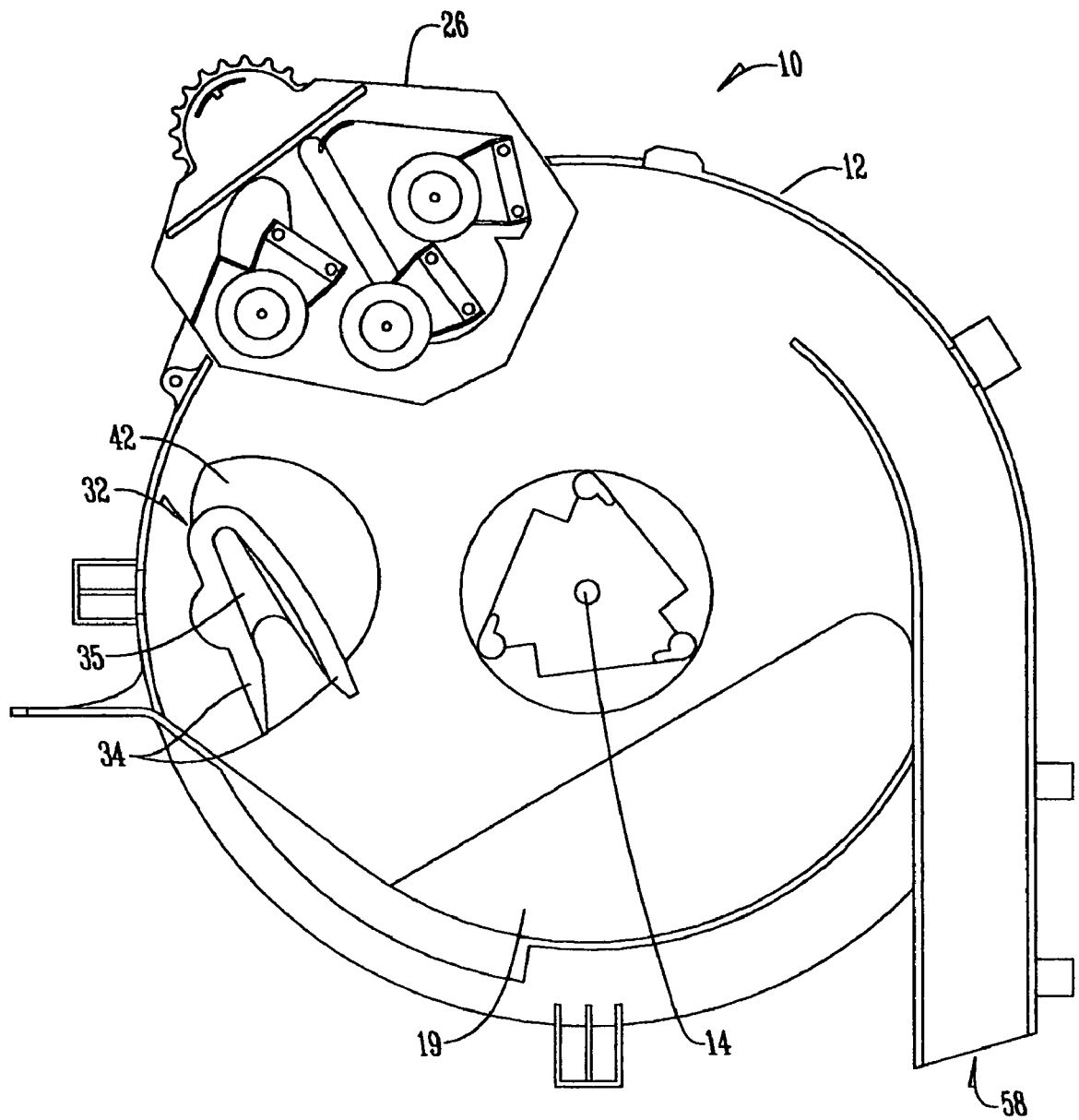
FIG. 7 is a view similar to that of FIG. 6 but in a different stage of operation.

When the predetermined number of seeds have been removed from the compartment 35 of the RSC 32 by the seed plate 20, the controller then actuates the cylinder 46 to move the piston rod 48 from the position of FIG. 3 back to the position of FIG. 5. This causes the flapper valve 56 to open, as discussed above, as the wing 42 closes the discharge port 31 of the chamber 30 (FIG. 7). The second group of seed is then staged at the wing 42 directly adjacent the seed plate 20 for the next set of plantings, and the sequence of events is repeated so that individual seeds from a second group of seeds are picked up and then deposited for planting.

It is therefore seen that the entire operation of seed selection, the beginning of the planting sequence, the ending of the planting sequence, and the commencement of the planting system for a second group of seeds is controlled by a single controller which automatically commands the entire sequence of events. Thus, the device of this invention is economically manufactured, and the maintenance burden and servicing burden is substantially minimized. It is thus seen that this invention will achieve all of its stated objectives.

We claim:

1. A method of metering seed for planting seed in a seed metering research plot, comprising, taking a plurality of groups of seeds, sequentially moving seeds from each group of seeds to a seed intake compartment on a seed meter, wherein the seed meter comprises a housing and a rotatable seed chamber (RSC) mounted in the housing adjacent a vacuum type seed plate and movable between a first and a second position, wherein the seed plate singularly selects individual seeds from the RSC while in the first position and dumps seeds from the RSC while in the second position, simultaneously releasing seeds from the seed intake compartment to the RSC and stopping seed movement to a seed planter via the vacuum type seed plate, and simultaneously starting the release of seeds to the seed plate from the RSC and stopping the flow of seeds from the seed intake compartment to the RSC.

2. The method of claim 1 wherein the simultaneous steps are powered and coordinated by a single power means.

3. The method of claim 1 wherein the RSC is operatively associated with the seed plate to wipe remaining seeds from the seed plate when the RSC is in the second position.

4. The method of claim 1 further comprising the step of dumping any remaining seeds from the RSC by gravity to a non-planting location when the flow of seeds is released between the seed intake compartment to the RSC.

* * * * *